INVENTORS
Robert D. Brackett
and
Herman C. Erikson
Brown and Mikulka
and
Charles S. McGuire
ATTORNEYS

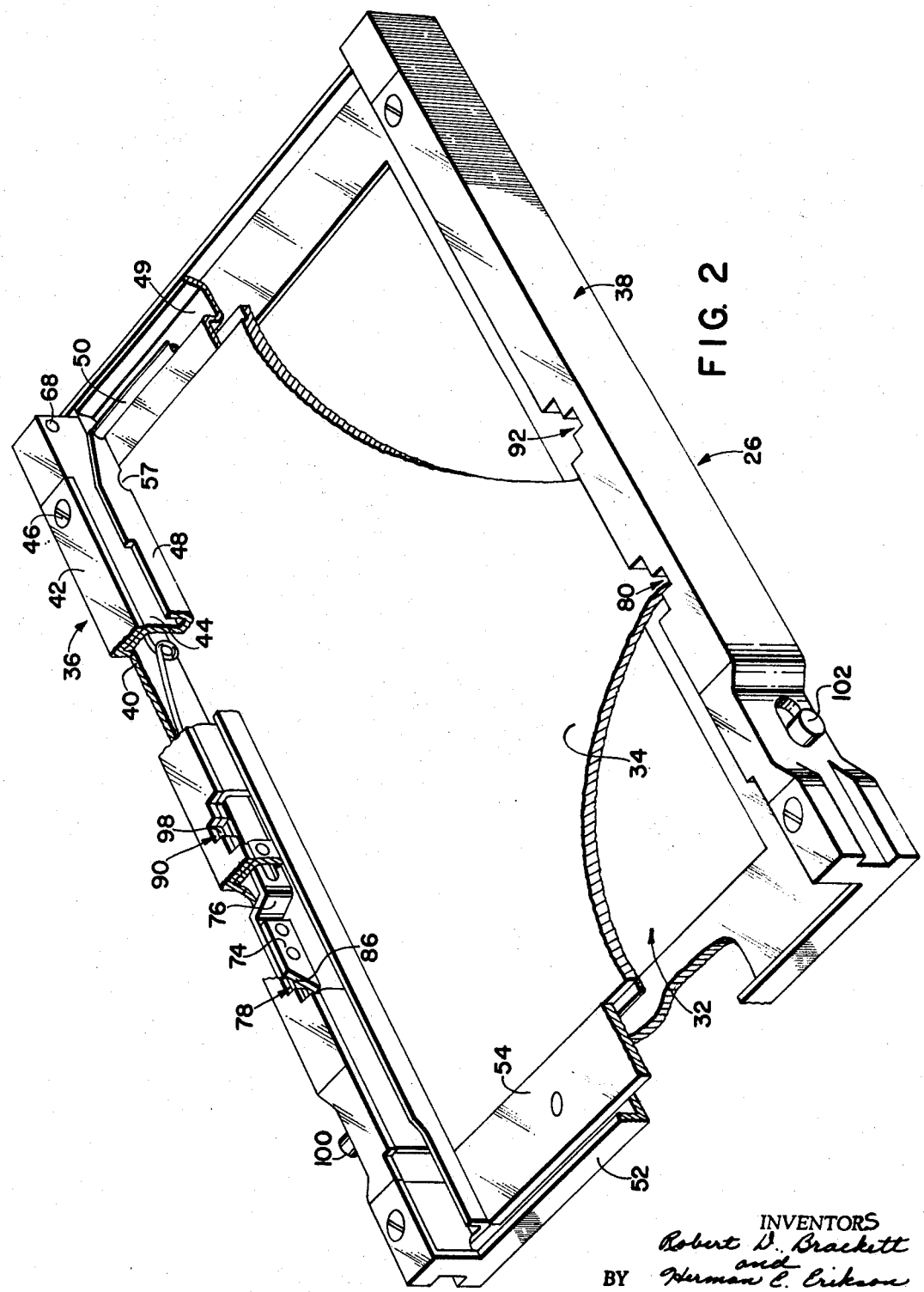

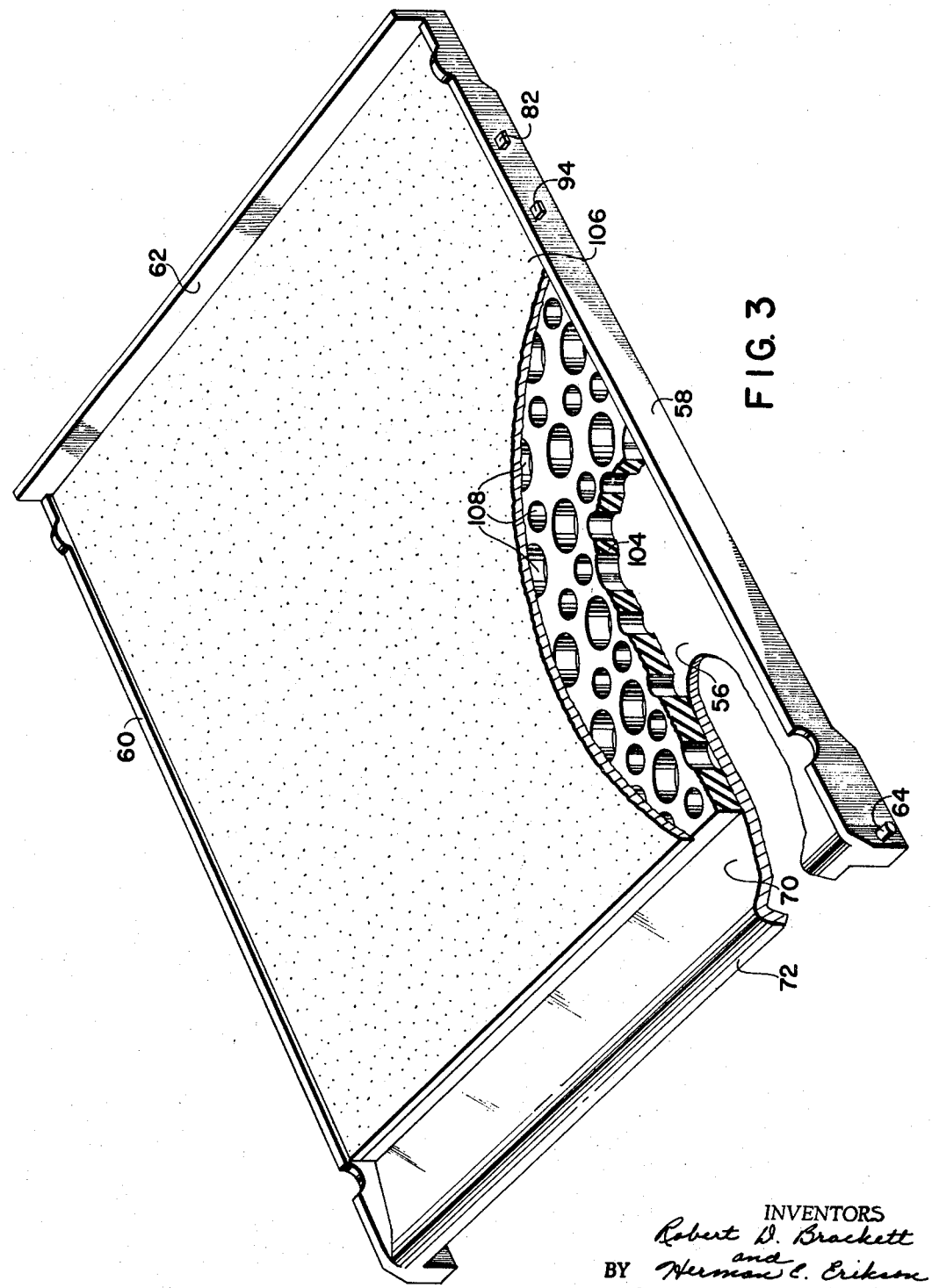

Feb. 27, 1968 R. D. BRACKETT ET AL 3,371,208
X-RAY FILM CASSETTE HAVING MEANS FOR REMOVING THE
FILMS WHILE MAINTAINING A LIGHT-TIGHT CONDITION
Filed July 12, 1965 5 Sheets-Sheet 4
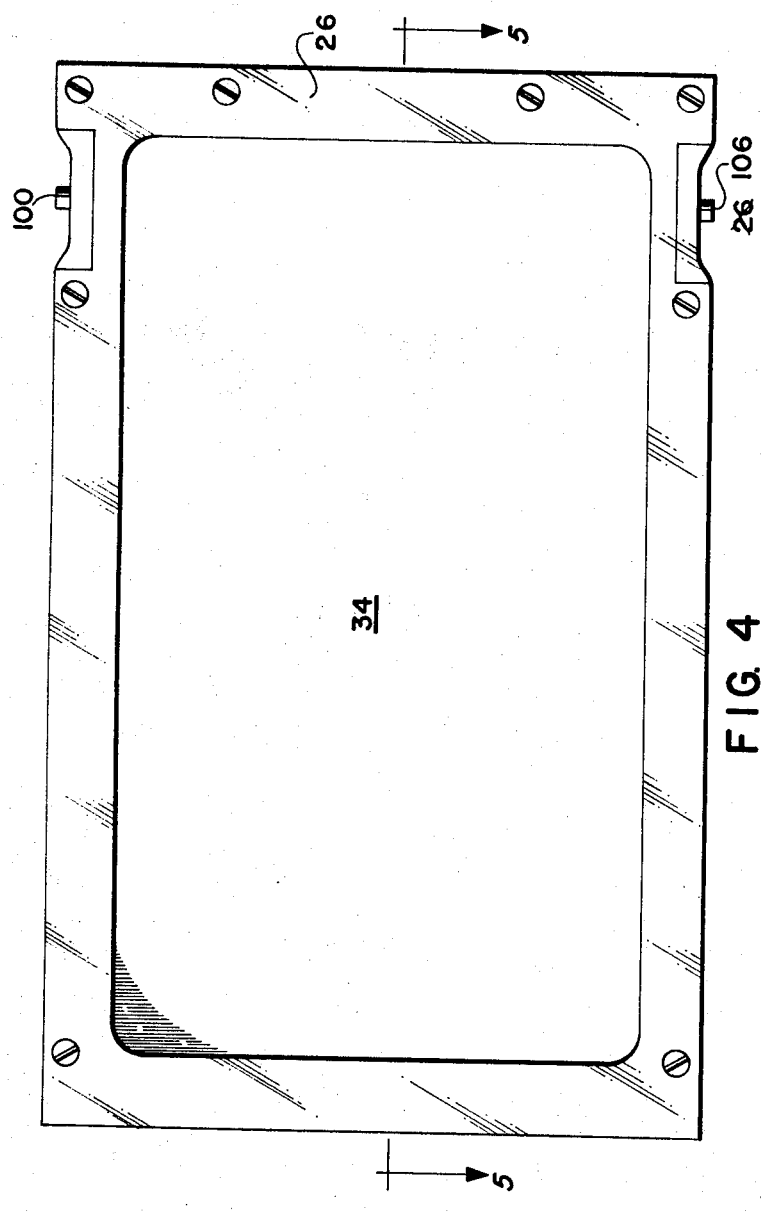
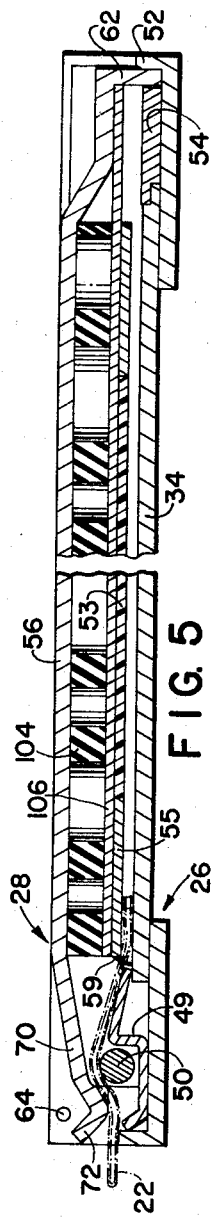
INVENTORS
Robert D. Brackett
and
BY Herman E. Erikson
Brown and Mikulka
and
Charles L. McGuire
ATTORNEYS

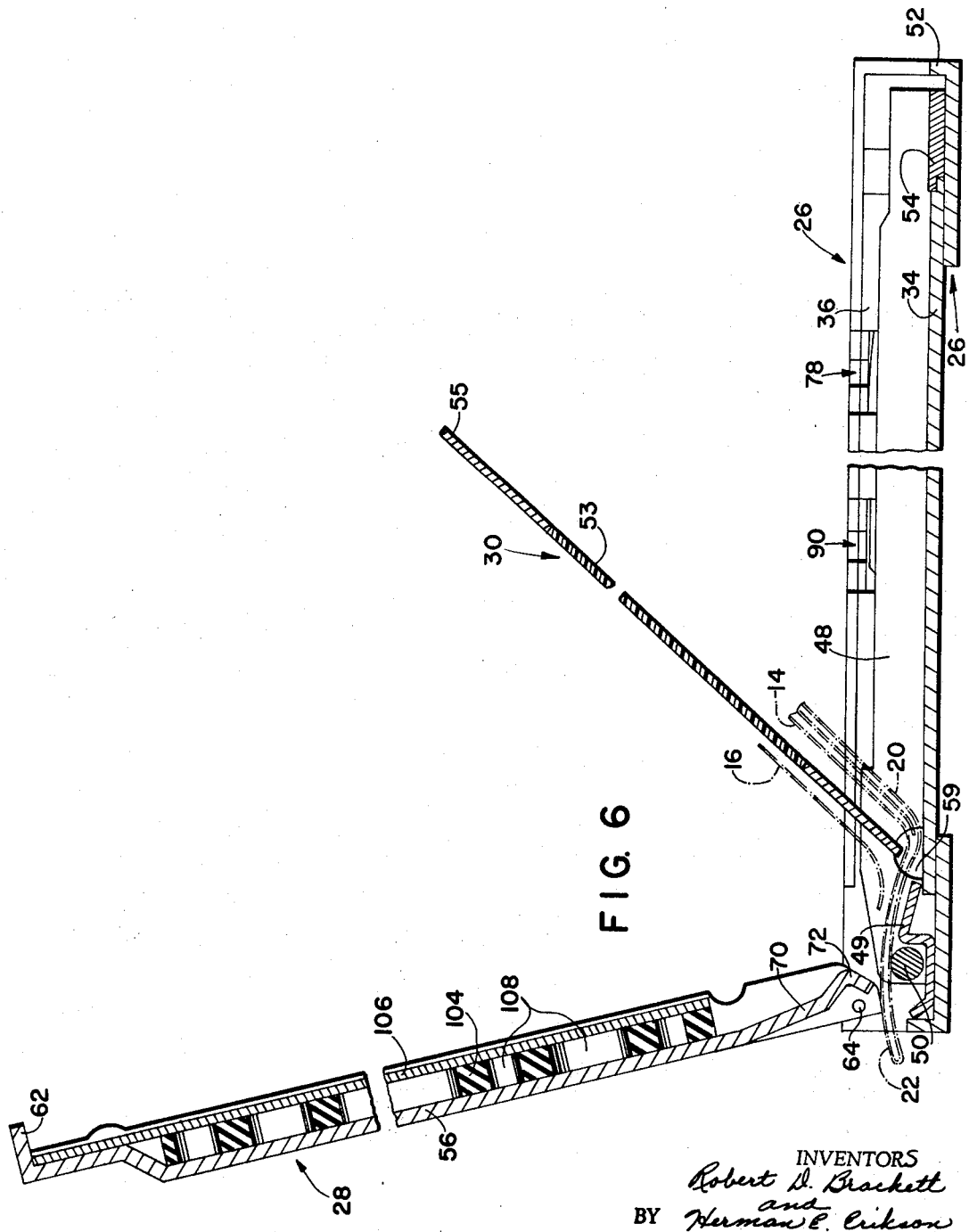

United States Patent Office 3,371,208
Patented Feb. 27, 1968

3,371,208
X-RAY FILM CASSETTE HAVING MEANS FOR REMOVING THE FILMS WHILE MAINTAINING A LIGHT-TIGHT CONDITION
Robert D. Brackett, Wakefield, and Herman E. Erikson, Winchester, Mass., assignors to Polaroid Corporation, Cambridge, Mass., a corporation of Delaware
Filed July 12, 1965, Ser. No. 471,275
13 Claims. (Cl. 250—68)

ABSTRACT OF THE DISCLOSURE

The present application relates to a cassette for use in X-ray photography in conjunction with a film unit having a protective envelope which is adapted to be removed preliminary to the exposure and to be replaced thereafter. The cassette includes, in addition to relatively pivotal base and cover elements and a pivotal intensifyingn screen, a freely rotatable roller positioned, adjacent to an aperture for withdrawing the envelope for facilitating movement of the envelope and for providing an internal light barrier with respect to any ambient light entering the aperture.

---

A well-known method of making radiographs through exposure of a suitable photographic film to an X-ray beam involves processing of the exposed film according to the diffusion-transfer process. Radiographic packets suitable for carrying out such a process normally include a photosensitive sheet capable of recording a latent image when exposed by impinging an X-ray beam on an intensifying screen with which the sheet is in contact, a second sheet capable of receiving a positive transfer print from the photosensitive sheet, and a rupturable container carrying a liquid processing agent for distribution between the two sheets to effect the necessary processing and transfer steps. Several types of such radiographic packets are presently commercially available and include the types designated as 3000X, 3001X and TLX manufactured by Polaroid Corporation of Cambridge, Massachusetts.

Casettes for holding radiographic packets of the aforementioned type have also been designed and include those shown in U.S. Patents 2,709,223 of Bachelder et al. and 2,726,337 of Stava et al. Such cassettes are designed to allow loading of the packet in lighted surroundings and include provisions for allowing withdrawal from the cassette of an opaque envelope which initially encloses the photosensitive sheet after the packet has been loaded in the cassette. Pressure-applying means are provided to insure close contact between the photosensitive sheet and the intensifying screen within the cassette during exposure. Further means are provided to decrease this pressure when desired to allow withdrawal of the aforementioned envelope from the closed cassette without excessive friction, while still maintaining the interior of the cassette in lighttight condition. Such means involve, of course, manual movement of certain portions of the cassette both during the loading operation and when the packet is to be removed from the cassette.

The present invention contemplates a novel cassette construction of the general type described above. A principal object of the invention is to provide a cassette for holding a self-developing radiographic film packet wherein the operations of loading the packet into the cassette and removing the opaque envelope therefrom are greatly simplified over previously known cassette constructions of this general type.

A further object is to provide a film-holding cassette wherein the bounding portions of the cassette cooperate to form an essentially lighttight seal when the cassette is closed and include one edge having members which form such a light seal while at the same time facilitating removal of the film, or other elements associated therewith.

Another object is to provide a cassette construction wherein a portion of a film packet, such as an opaque envelope, may be withdrawn from the cassette while the latter is maintained in a lighttight condition without the necessity of relieving the pressure between elements of the cassette and the film packet, while still providing close contact between the photosensitive surface of the film packet and the intensifying screen of the cassette.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is a perspective view, with portions broken away, of certain elements of the cassette of FIGURE 1;

FIG. 3 is a perspective view, with portions broken away, of other elements of the cassette;

FIG. 4 is a top plan view of the cassette of FIGURE 1;

FIG. 5 is a side sectional view on the line 5—5 of FIG. 4; and

FIG. 6 is a side sectional view, as in FIG. 5, showing the cassette in the open position with portions of the film packet.

Figure 1:
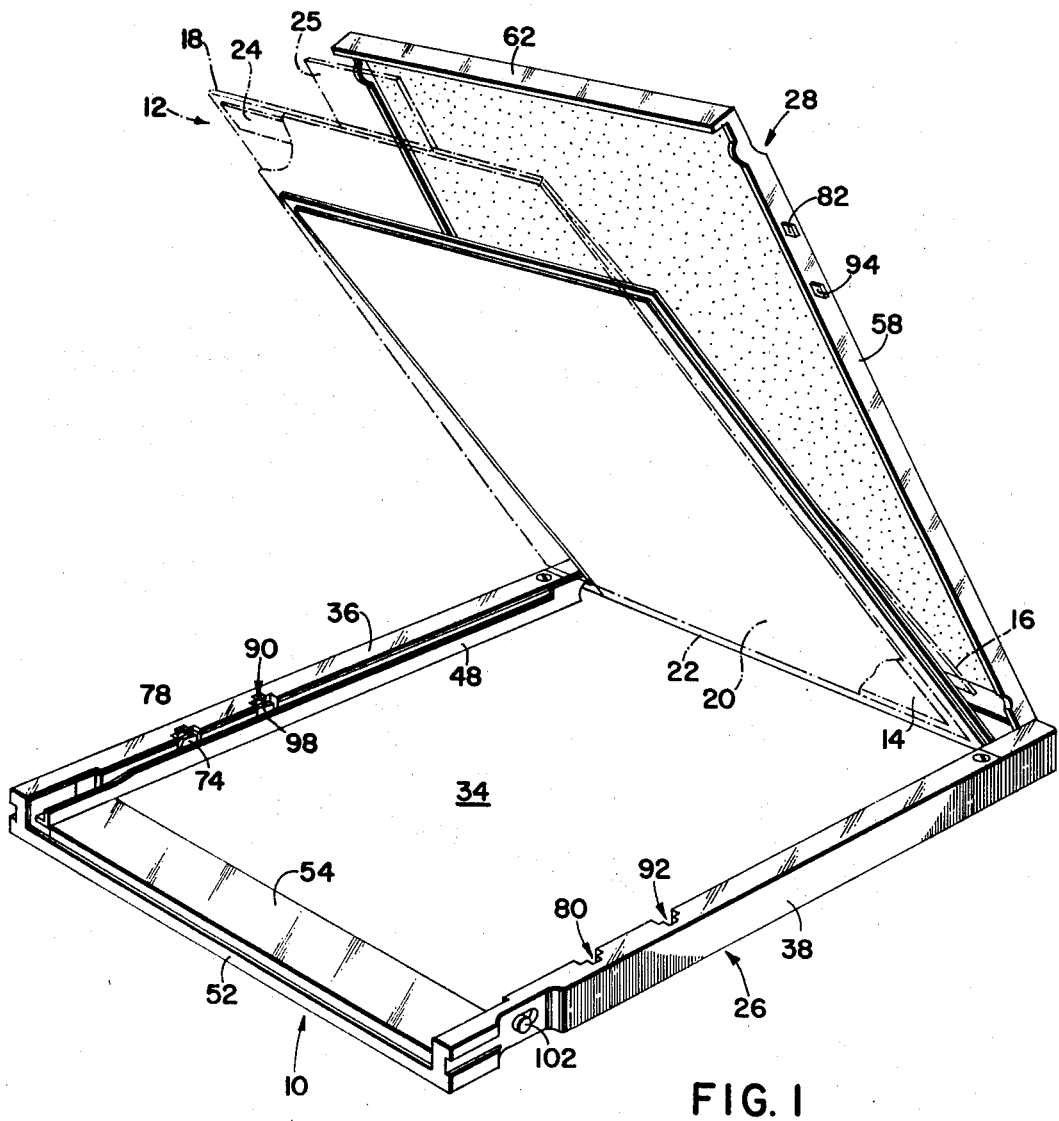
FIGURE 1 is a perspective view of one embodiment of the cassette of the present invention shown in the open position with a radiographic film packet being loaded therein.

Referring now to the drawings, in FIGURE 1 is shown the cassette of the invention, designated generally by the reference numeral 10, with a representative film packet, designated generally by the reference numeral 12, of the type intended for use in the cassette. Film packet 12 is of the self-developing type intended to be used in carrying out a diffusion transfer process, and especially adapted for use in X-ray photography. Although film packet 12 is shown somewhat diagrammatically, specific examples of commercial embodiments thereof have been previously mentioned herein, and it will be understood that the particular construction thereof forms no part of the present invention. Packet 12 includes a pair of liquid confining layers 14 and 16 which are hinged together at one end 18, whereby they may be arranged in overlying relation or may be spread apart with respect to one another. Layer 14 includes a photosensitive area over at least a portion of the surface thereof which faces layer 16 and is initially enclosed in an opaque envelope 20 to permit handling of packet 12 in lighted surroundings without exposure or fogging of the photosensitive material. Layer 16 includes means for receiving, on the surface thereof facing layer 14, a positive transfer image by means of the well-known diffusion transfer process. Suitable leader means, not shown in detail, are provided in known fashion for hingedly attaching layers 14 and 16 and for maintaining the interior of envelope 20 in a lighttight condition. According to the usual construction of such packets, envelope 20 is closed at the sides and at end 22 while being open at the opposite end where the aforementioned means for maintaining the envelope in a lighttight condition are provided. Rupturable container 24 is positioned between layers 14 and 16 at or near hinged end 18. The container carries a supply of a suitable processing liquid which may be released from the container by the application of a compressive force thereto and spread between layers 14 and 16. Leader or tab 25 extends from one end of film packet 12 and also extends outside cassette 10 to serve as a means for withdrawing the film packett after exposure from one side of the cassette, hereafter termed the leading side or end. Further constructional details of a preferred film packet for use in the cassette of the present invention may be found in copending U.S. application Serial No. 471,364 filed of even date herewith.

Photosensitive assemblies such as those illustrated herein make use of the principles of a transfer process, as previously mentioned. These principles, as well as other specific film structures suitable for use in this invention, are set forth in U.S. Patents Nos. 2,543,181, 2,544,268, 2,634,886, 2,603,565, 2,647,056, 2,565,378, all to Edwin H. Land, said Patents Nos. 2,544,268 and 2,565,378 being specific to film assemblies especially adapted for X-ray photography. These various patents include detailed descriptions of film assemblies which employ a liquid-confining layer having a photosensitive area and a liquid-confining layer in the nature of a print-carrying element which are adapted to contain all of the photographic materials needed to process the assembly. Also, the said patents are detailed as to containers for holding processing materials and further include descriptions of liquid processing compositions usable with film assemblies including, in Patents Nos. 2,544,268 and 2,565,378, a liquid processing composition employable to develop a negative without forming a positive image. The practices, photographic materials and compositions described in said patents are generally suitable for carrying out the present invention.

Cassette 10 includes three principal sections, designated generally as base member 26, cover member 28 and intensifying screen member 30. Both cover member 28 and screen member 30 are mounted upon base member 26 for pivotal movement with respect thereto about suitable hinged connections, as described more fully hereinafter. The three principal sections of cassette 10 are generally planar in shape and may be moved about their mutual hinged connections between an open position, such as that shown in FIGURE 1, and a closed position, wherein the three sections are in closely superposed relation.

Base member 26 is of rigid construction, preferably formed of a suitable metal, and includes a centrally disposed, generally rectangular opening 32 (FIG. 2), which is covered by a sheet of material 34 which has the property of being opaque to visible and near visible light while allowing the passage of X-rays, such as Bakelite, for example. Side members 36 and 38 extend the length of base member 26 between the end at which cover member 28 and screen member 30 are mounted and the opposite end. Although certain portions of only one of the side members may be shown in certain figures, the two members and other elements associated therewith are essentially identical in construction and it will be understood that descriptive matter pertaining to either of the side members applies to the other in the same manner. With reference to FIG. 2, it will be noted that side member 36 includes outer wall 40, upper wall 42 and inner wall 44 defining a hollow enclosure along the side of base member 26. Upper wall 42 is preferably formed, as shown, by joining together overlapped extensions of outer wall 40 and inner wall 44. Thus, the outer and inner walls are formed from separate members which may be joined by removable means such as one or more screws 46 to allow access to the hollow interior of side member 36. Inner wall 44 of side member 38 is extended inwardly and upwardly to form rail 48, substantially parallel and in slightly spaced relation to inner wall 44, thereby forming a channel between the double walls 44 and 48. Wall member 49 and roller 50 are mounted to extend across base member 26 near the hinged connection therewith of cover member 28 and screen member 30. Base member 26 further includes lip 52 extending between side members 36 and 38 across the end opposite the aforementioned hinged connections. Plate 54 is secured to the inside of base member 26 and assists in holding material 34 in its covering relation to opening 32. It will be noted that a relatively narrow space is provided between opposing surfaces of lip 52 and plate 54, thus extending the channel along the side to include also the loading end of cassette 10.

Screen member 30 includes a rectangular portion on the surface thereof which faces base 26 adapted to emit radiation within the visible spectrum when struck by X-rays. A number of materials, most commonly phosphors, are used for such purposes. The phosphor, or other such X-ray sensitive material, is supported on a base material, indicated at 53 in the drawings accompanying the present disclosure. The screen of cassette 10 preferably comprises a fluorescing material carried on a relatively thin flexible base layer such as a suitable plastic. Base 53 in turn is supported by a rectangular support frame 55, made of a thin sheet metal, for example, having a centrally disposed opening, i.e., the material of frame 55 is cut out in the center to add to the flexibility thereof. Frame 55 includes projecting ears (not shown) at two corners thereof which extend into openings 57 (FIG. 2) and 59 (FIG. 5) in side members 36 and 38, respectively, thus forming the aforementioned pivotal mounting for screen member 30. Openings 57 and 59 are somewhat larger than the ears on frame 55 so that the pivotal mounting is rather loose and screen 30 may be moved a short distance laterally with respect to base 26, as well as pivotally.

Referring now to FIG. 3, there is shown a portion of the interior (i.e., the surface which faces base member 26 when cassette 10 is closed) of cover member 28. Cover member 28 includes relatively flat plate 56 bounded on each side by walls 58 and 60 and across the end opposite the hinged connection of the cover with the base by wall 62. Walls 58, 60 and 62 extend a short distance perpendicularly inward from plate 56 and are preferably formed integrally therewith. The hinged connection of cover member 28 with base member 26 may be conveniently and economically constructed by means of pins, such as shown at 64, which extend into openings such as that shown at 68 (FIG. 2) in side members 36 and 38. Thus, pin 64, and the corresponding pin on the other side of cover 28, define a pivotal axis about which the cover may be moved with respect to base 26.

The end of plate 56 between the hinged mounting of cover 28 is offset at a slight angle to the major surface of plate 56. That is, plate 56 may be said to define a substantially flat, rectangular portion of cover member 28 which is adapted to be moved about a pivotal axis to a closed position with respect to base 26. Portion 70 of cover member 28 extends out of the general plane of plate 56 toward base member 26 when the cassette is in the closed position, as shown in FIG. 5. End portion 72 of cover member 28 extends back away from base portion 26, i.e., in the opposite direction from portion 70.

Cover member 28 and base portion 26 are so dimensioned and arranged for relative movement that walls 58, 60 and 62 of the cover member extend into the previously described channel formed by the double wall means around the corresponding three sides of the base member. This arrangement is effective to form a change of direction, or labyrinth, light seal around these three sides of the cassette. It is further necessary, of course, to provide means for effectively preventing entry of light into the cassette along the fourth side of the cassette, through which the pivotal axis of the cover and base members passes. In the cassette of the present invention provision is further made for withdrawing a portion of the film assembly from the interior of the cassette through the fourth side while still maintaining the interior of the cassette in a lighttight condition. It is also desirable to effect such withdrawal without disturbing the closed position of the cassette, such as by relieving frictional engagement between portions of the cassette and the film assembly position therein, in order to simplify the process of loading the film assembly into the cassette and preparing it for exposure.

As shown in FIG. 6, the cassette is in the open position with base member 26, cover member 28 and screen member 30 moved away from superposition with one another. Roller 50 is mounted, in the manner previously described, upon base member 26 between, and parallel to, the pivotal axes of cover member 28 and screen member 30. As film packet 12 is loaded into the cassette closed end 22 of envelope 20 passes between base member 26 and the edge of screen member 30 about which the latter is pivotally movable. End 22 of the envelope then passes between roller 50 and the edge of cover member 28 about which the latter is pivotally movable, to extend outside the cassette along the previously mentioned fourth side thereof. Due to the relative arrangement of the pivotal axis of cover member 28 and wall portions 70 and 72 thereof, these wall portions are moved to provide a wider space between roller 50 and the fourth side of the cover member when cassette 10 is moved to the open position. As seen in FIG. 6, the relative positions of the various elements when the cassette is in the open position cooperate to form an opening along the fourth side of the cassette which facilitates insertion therethrough of end 22 of envelope 20.

After insertion of end 22 of envelope 20 through the fourth side of the cassette, as described above, and positioning of layer 16 of the film packet on the opposite side of screen member 30 from envelope 20 and layer 14, cassette 10 may be moved to the closed position. This is effected merely by moving cover member 28 and screen member 30 about their respective pivotal axes into superposed relation with the base member 26. Cassette 10 is shown in FIG. 5 in the closed position with end 22 of envelope 20 extending therefrom for manual withdrawal of the envelope from the cassette by pulling in the direction indicated by the arrow. It will be noted that one surface of envelope 20 will ride on roller 50 as the envelope is withdrawn. This will greatly reduce any frictional resistance between the cassette and envelope, thus facilitating withdrawal of the latter. Also, the arrangement of wall portions 70 and 72 with respect to roller 50 and wall member 49 is seen to be such that there is no direct light path into cassette 10 through the envelope withdrawal end thereof. Thus, a labyrinth type light seal is also formed at this end of the cassette, making the interior thereof essentially lighttight. This condition is enhanced, of course, by the use of non-reflective materials or coatings on the interior portions adjacent the boundaries of the cassette.

Latch means are provided for maintaining cassette 10 in the closed position shown in FIG. 5. The latch means are arranged within the hollow interiors of side members 36 and 38, and include latch plate 74 and slide 76 (FIG. 2). Slide 76 is mounted for reciprocal sliding movement within side member 36 by any convenient means such as rivets or studs extending inwardly from a wall of the side member through elongated openings in slide 76. Appropriate spring means (not shown) are provided for urging slide 76 toward the leading edge of cassette 10. Openings 78 and 80 are provided in the upper walls of side members 36 and 38 in registration with the latch plates when the latter are in the forward position. Pin or lug 82 extends outwardly from wall 58, and a similar pin extends outwardly from the same position on wall 60 of cover member 26, these pins being arranged to pass through openings 78 and 80 when the cassette is moved to the closed position. The pin extending from wall 60 will contact sloping surface 86 of latch plate 74 and cam the latch plate and slide rearward as the cover and base members are moved together.

As the pin passes the bottom edge of the latch plate, the spring biasing means will again move the latch plate and slide forwardly over the pin on the cover so that the cover and base members are held in the closed position.

Also provided in the hollow interiors of side members 36 and 38 are a pair of torsion springs, one of which is shown in FIG. 2 and designated by the reference numeral 88. A second pair of openings 90 and 92 are provided in the upper walls of the side members in registration with a second pair of pins, one of which is shown at 94, on cover member 26. Portion 98 of spring 88 extends across opening 90, and spring 88 is so arranged within side member 38 that portion 98 is biased toward movement into engagement with the inner surface of upper wall 42 of side member 36. When cassette 10 is moved into the closed position, pin 94 and the corresponding pin on wall 60 contact the portion of the torsion spring extending across openings 90 and 92 and deflect the spring downwardly. Thus, the spring exerts an upward force on the pins, urging the cover and base members apart, i.e., away from the closed position, wherein they are retained by the previously described latch means.

Buttons 100 and 102 extend outwardly through elongated openings in side members 36 and 38, respectively. Button 100 is fixedly attached to a forwardly extending portion of slide 76 and button 102 is likewise attached to the slide within side member 38. Thus, rearward movement of buttons 100 and 102 is effective to move the slides and latch plates rearwardly out of engagement with the pins on cover member 28. Upon such movement of buttons 100 and 102 and consequent release of the latch means, torsion spring 88, and the corresponding spring within side member 38, moves cover member 28 a short distance about its pivotal mounting away from the closed position. This relative movement of the cover and base members is sufficient to allow withdrawal from the leading side of the cassette of film packet 12.

Means are provided within cassette 10 for urging the intensifying screen and photosensitive layer 14 into close engagement over the opposing surfaces thereof. Such means are illustrated as comprising a layer of spongelike material 104, such as foam rubber, and a layer of a pile or flocked fabric 106. It will be understood, however, that the specific structure of the means used to urge the screen and photosensitive material into mutual engagement forms no part of the present invention. Material 106 preferably includes a base layer having a plurality of closely spaced, flexible fibers extending perpendicularly outward therefrom. An example of such material is that manufactured under the trade name Vertipile by Vertipile Incorporated of Lowell, Massachusetts. Layer 104 is secured in covering relation to the interior surface of cover member 28 and layer 106 is secured in covering relation to layer 104 with the aforementioned flexible fibers extending away from the cover member. The thickness of layer 104 and the length of the fibers on layer 106 are such that when cassette 10 is in the closed position layer 104 is compressed and the fibers are somewhat flexed by contact with the opposing surface within the cassette. Thus, the natural resiliency of the material of layer 104 and the fibers of layer 106, tending to return layer 104 and the fibers of layer 106 to their natural, uncompressed and unflexed positions, will exert a substantially uniform pressure against screen member 30, urging the latter into engagement with the photosensitive layer 14 of film packet 12, which is positioned between the screen and base member 26. Layer 104 may be provided with cutout portions 108 in any desired number and spacing to provide the desired compressive force when the cassette is in the closed position.

The functional engaging force between elements of the cassette and film packet provided by the resilient means previously described should be kept to the minimum required to insure the necessary intimate contact between the surfaces of the screen and photosensitive film so that the frictional resistance to removal of the envelope will not be more than necessary. With the novel structure provided along the end through which the envelope is withdrawn, this operation may thus be performed without the necessity of relieving the pressure within the cassette, as by bowing the cover and base members apart, as in previous cassette designs of this type. The roller provided along the envelope withdrawal end of the cassette not only reduces frictional resistance between the cassette and envelope, but also cooperates with wall portions of the cassette to form an effective light seal across this end of the cassette.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An X-ray cassette for holding during exposure a photosensitive film unit adapted to have a radiograph recorded thereon and having means facilitating movement of a protective envelope relative to a photosensitive portion of said film unit from said cassette while maintaining the latter in a light-tight condition, said cassette comprising, in combination:
   (a) a generally planar, rectangular, rigid base member having a centrally disposed portion which is opaque to visible and near-visible light and substantially transparent to X-rays;
   (b) a generally planar, rigid cover member;
   (c) hinge means securing said base and cover members together for pivotal movement about an axis substantially through adjacent edges of each of said members, into and away from superposed relation;
   (d) a rotatably mounted, elongated roller for reducing frictional resistance between a surface of the cassette and a surface of the moving envelope mounted upon one of said base and cover members to extend thereacross closely adjacent and parallel to said pivotal axis and with its peripheral portions spaced from portions of said members; and
   (e) wall means extending out of the general plane of the other of said base and cover members toward said one member, extending across said other member in closely spaced relation to said one member and said roller, whereby, when said members are in said superposed relation, said roller and said wall means cooperate to prevent the passage of light between said adjacent edges.

2. The invention according to claim 1 wherein said pivotal axis is so arranged with respect to said roller and wall means that the latter two are moved apart to provide a wider space therebetween when said base and cover members are moved away from said superposed position, thereby allowing a portion of said film unit to be inserted between said base and cover members.

3. The invention according to claim 2 wherein said roller is mounted on said base member and said wall means extends from said cover member toward said base member.

4. An X-ray cassette for holding a radiographic film assembly of the self-developing type wherein a photosensitive sheet of said assembly is contained within a removable, opaque envelope, said cassette comprising, in combination:
   (a) a generally planar, rectangular, rigid base member;
   (b) a generally planar, rigid cover member of substantially the same external, rectangular dimensions as said base member;
   (c) means connecting said base and cover members for pivotal movement about an axis substantially through one edge of each of said members, into and away from a superposed and closely adjacent position;
   (d) means carrying an intensifying screen mounted for positioning between said base and cover members when the latter are in said superposed position;
   (e) said base and cover members carrying opposing flange members on three sides thereof which cooperate to prevent the passage of light when said base and cover members are in said superposed relation;
   (f) one of said base and cover members carrying a rotatably mounted, elongated roller for reducing frictional resistance between a surface of the cassette and a surface of the moving envelope extending substantially completely across said one member parallel and adjacent to the fourth side thereof and with its peripheral portions spaced from portions of said members; and
   (g) the other of said base and cover members including a wall portion extending out of the general plane of said other member toward said one member, in closely spaced relation to said roller and said one member when said members are in said superposed position, whereby said wall portion and said roller cooperate to prevent the passage of light along said fourth side.

5. The invention according to claim 4 wherein said edge about which said cover and base members are pivotally movable comprises said fourth side thereof.

6. The invention according to claim 5 wherein said roller extends between and is mounted upon the flange members on two of said three sides of said one member.

7. An X-ray cassette for holding a radiographic film unit of the self-developing type having a pair of hingedly attached, superposable sheets, one of which includes a photosensitive portion enclosed in a removable, opaque envelope, said cassette comprising, in combination:
   (a) a generally planar, rectangular, rigid base member having a centrally disposed portion which is opaque to visible and near-visible light and substantially transparent to X-rays;
   (b) a generally planar, rigid cover member;
   (c) means attaching said base and cover members together for pivotal movement relative to one another;
   (d) a channel defined by double wall means extending perpendicular to the general plane of said base member along three sides thereof;
   (e) a lip extending outwardly from said cover member, perpendicular to the general plane thereof around three sides corresponding to the three sides of said base member whereon said channel is arranged;
   (f) said channel and lip being so constructed and arranged that upon pivotal movement of said base and cover members into superposed relation, said lip extends into said channel around said three sides of said members;
   (g) a generally planar, rectangular, intensifying screen;
   (h) means mounting said intensifying screen for pivotal movement relative to both of said base and cover members for positioning between the two when in said superposed relation;
   (i) the pivotal axis of said base and cover means being parallel and in spaced relation to the pivotal axis of said screen along the fourth side of said base and cover members;
   (j) a rotatably mounted, elongated roller extending substantially across said fourth side of said cassette, between said pivotal axes;
   (k) first wall means extending from said cover toward said base member along said fourth side, parallel and closely adjacent to said roller; and
   (l) second wall means extending from said base toward said cover member along said fourth side, parallel and closely adjacent to said roller and on the opposite side thereof from said first wall means, whereby the cooperative arrangement of said first and second wall means and said roller form a change-of-direction light seal when said base and cover members are in said superposed relation.

8. The invention according to claim 7 wherein said roller is mounted on said base member between opposite and parallel portions of said wall means.

9. The invention according to claim 8 wherein said pivotal axis of said base and cover means is so arranged with respect to said first wall means that the latter is moved into more widely spaced relation to said base member as said base and cover members are moved away from said superposed relation.

10. The invention according to claim 9 wherein said intensifying screen is pivotally mounted on said base member with the pivotal axis thereof more widely spaced from said fourth side than the pivotal axis of said base and cover means.

11. The invention according to claim 10 wherein the pivotal axis of said intensifying screen passes substantially through one edge of said screen and is in spaced relation to the surface of said base member which faces said screen and cover member when in said superposed relation, thereby allowing an end portion of said opaque envelope to be inserted between said screen and base member.

12. The invention according to claim 11 and further including latch means for releasably securing said base and cover members in said superposed position with said screen therebetween.

13. The invention according to claim 12 and further including resilient means urging said base and cover member away from said superposed relation when said members are secured in said relation, whereby said resilient means effect separation of said base and cover members when said latch means are released.

References Cited

UNITED STATES PATENTS 2,740,897  4/1956  Fairbank _____ 250—68
3,174,039  3/1965  Frede et al. _____ 250—68

RALPH G. NILSON, *Primary Examiner.*

A. L. BIRCH, *Assistant Examiner.*